April 2, 1957 W. F. HEATH 2,787,097
HONING MANDREL
Filed July 11, 1955 7 Sheets-Sheet 1
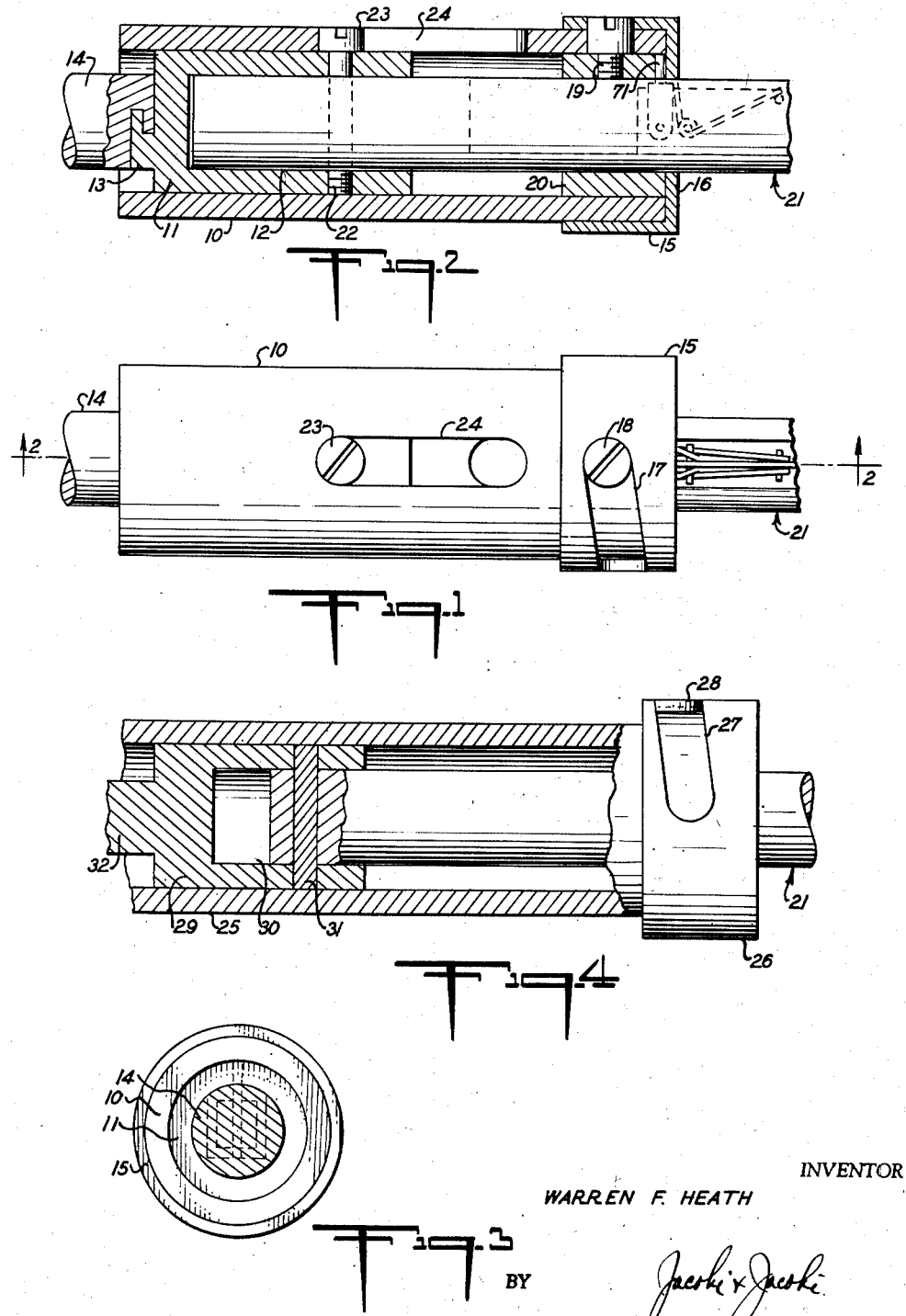
INVENTOR
WARREN F. HEATH
BY
ATTORNEYS

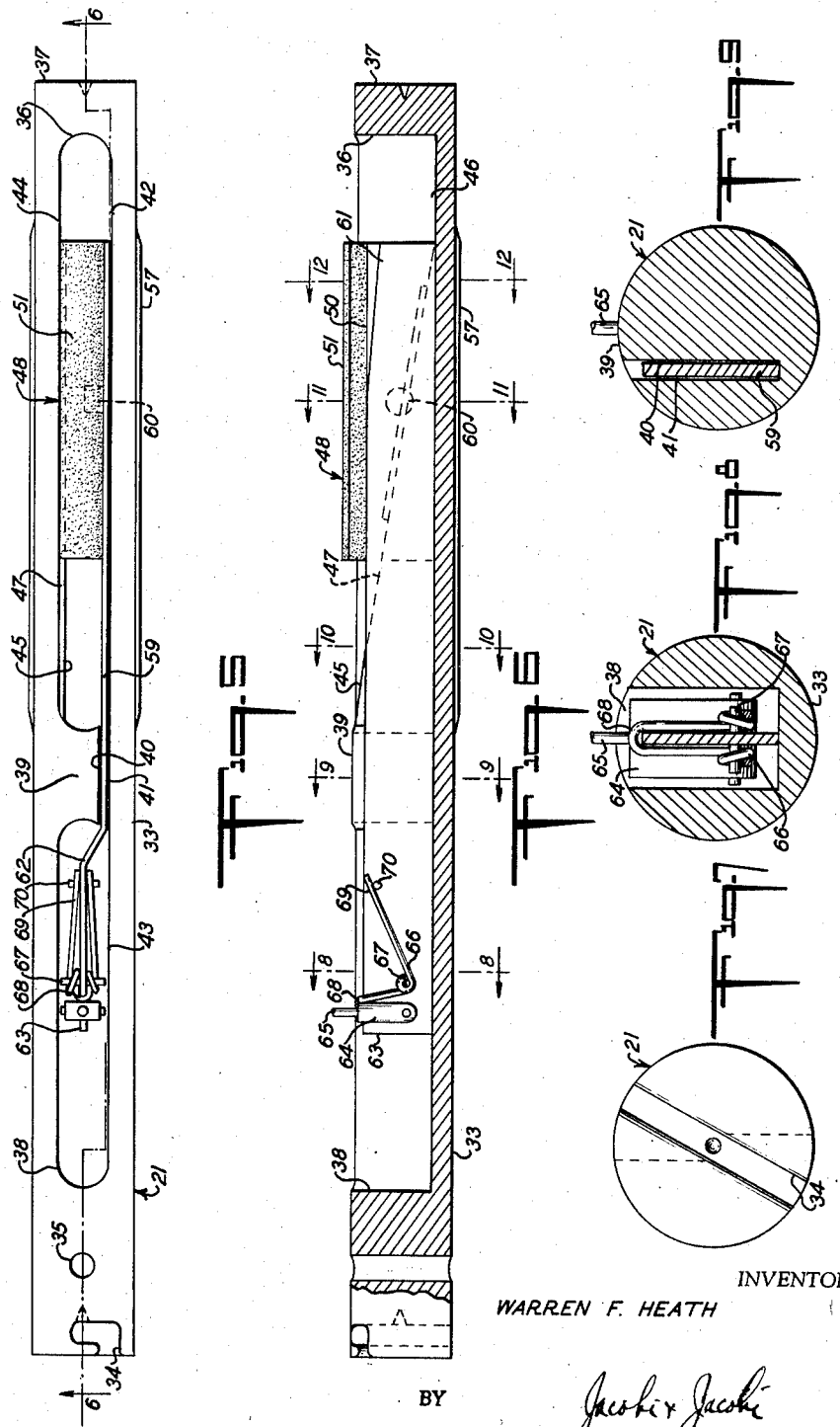

April 2, 1957  W. F. HEATH  2,787,097
HONING MANDREL
Filed July 11, 1955  7 Sheets-Sheet 3
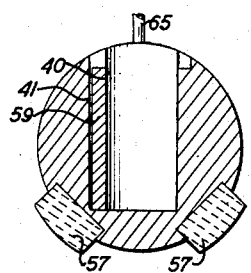
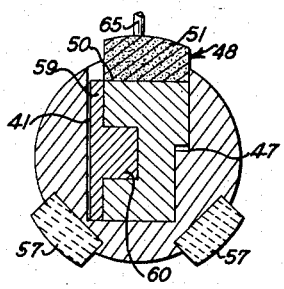
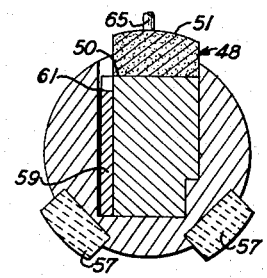
Fig.10
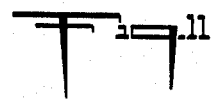
Fig.11
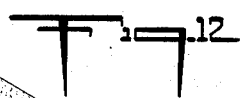
Fig.12
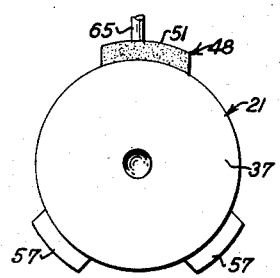
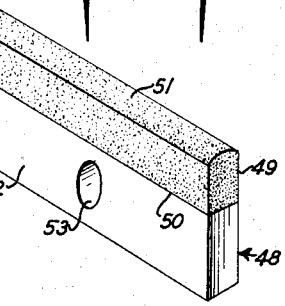
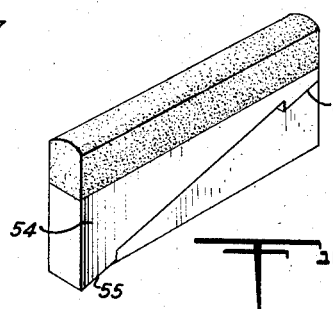
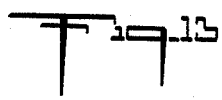
Fig.13
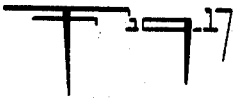
Fig.17
Fig.16
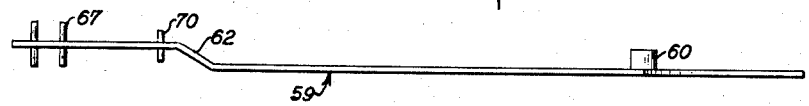
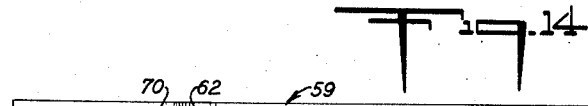
Fig.14
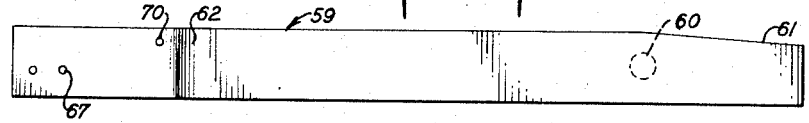
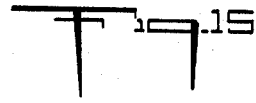
Fig.15
INVENTOR
WARREN F. HEATH
BY  *Jacobi & Jacobi*
ATTORNEYS

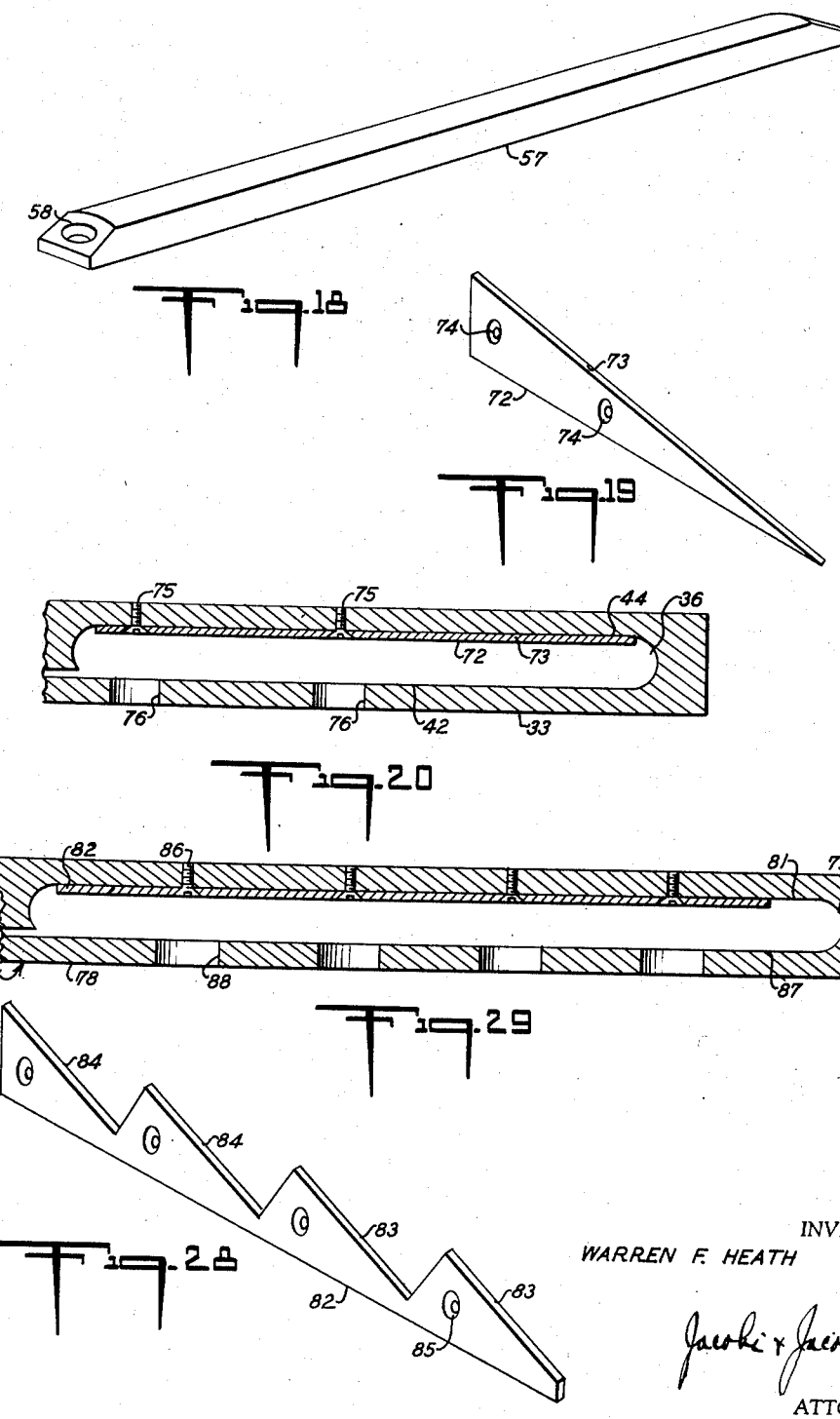

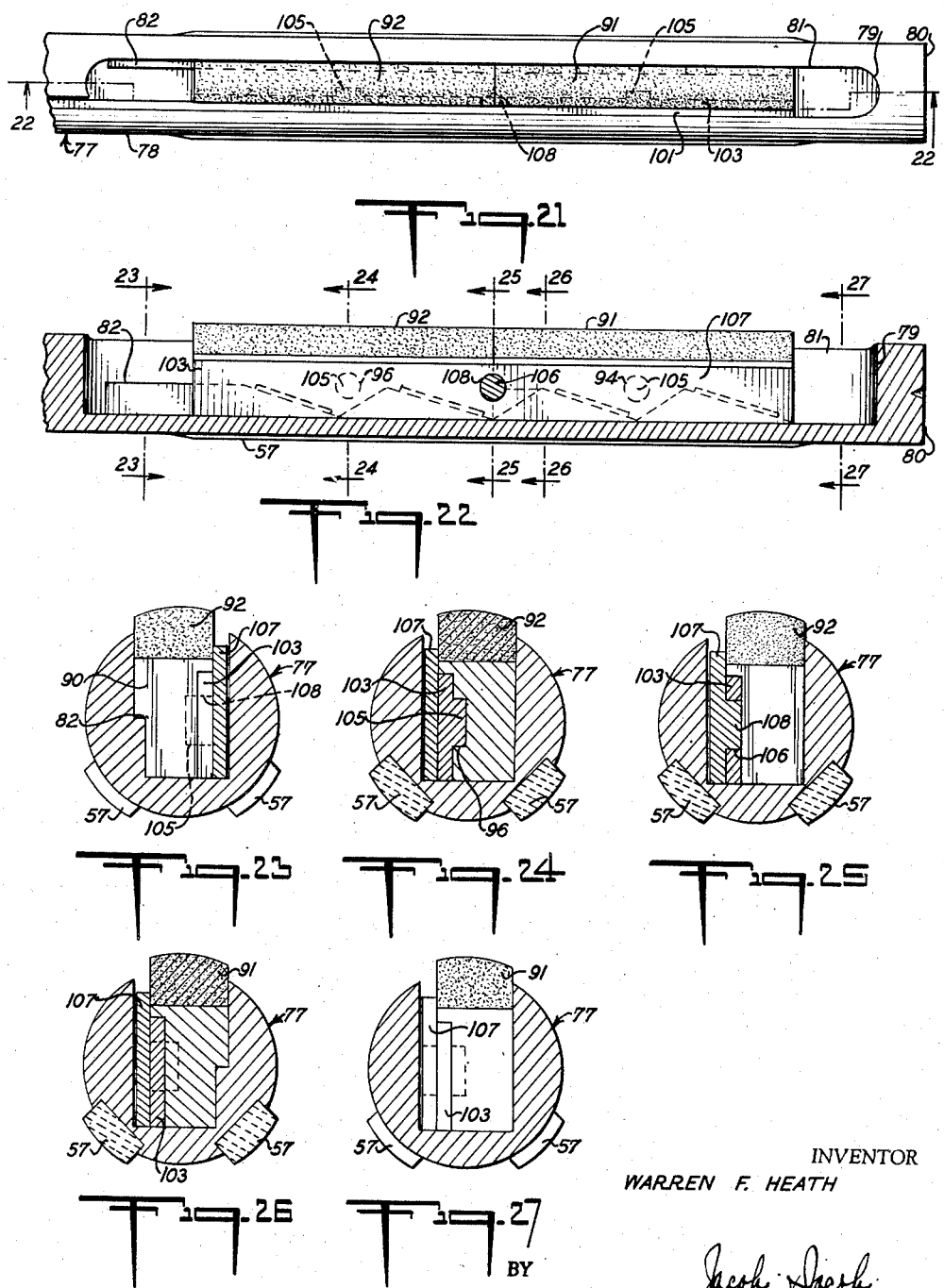

April 2, 1957  W. F. HEATH  2,787,097
HONING MANDREL
Filed July 11, 1955  7 Sheets-Sheet 6
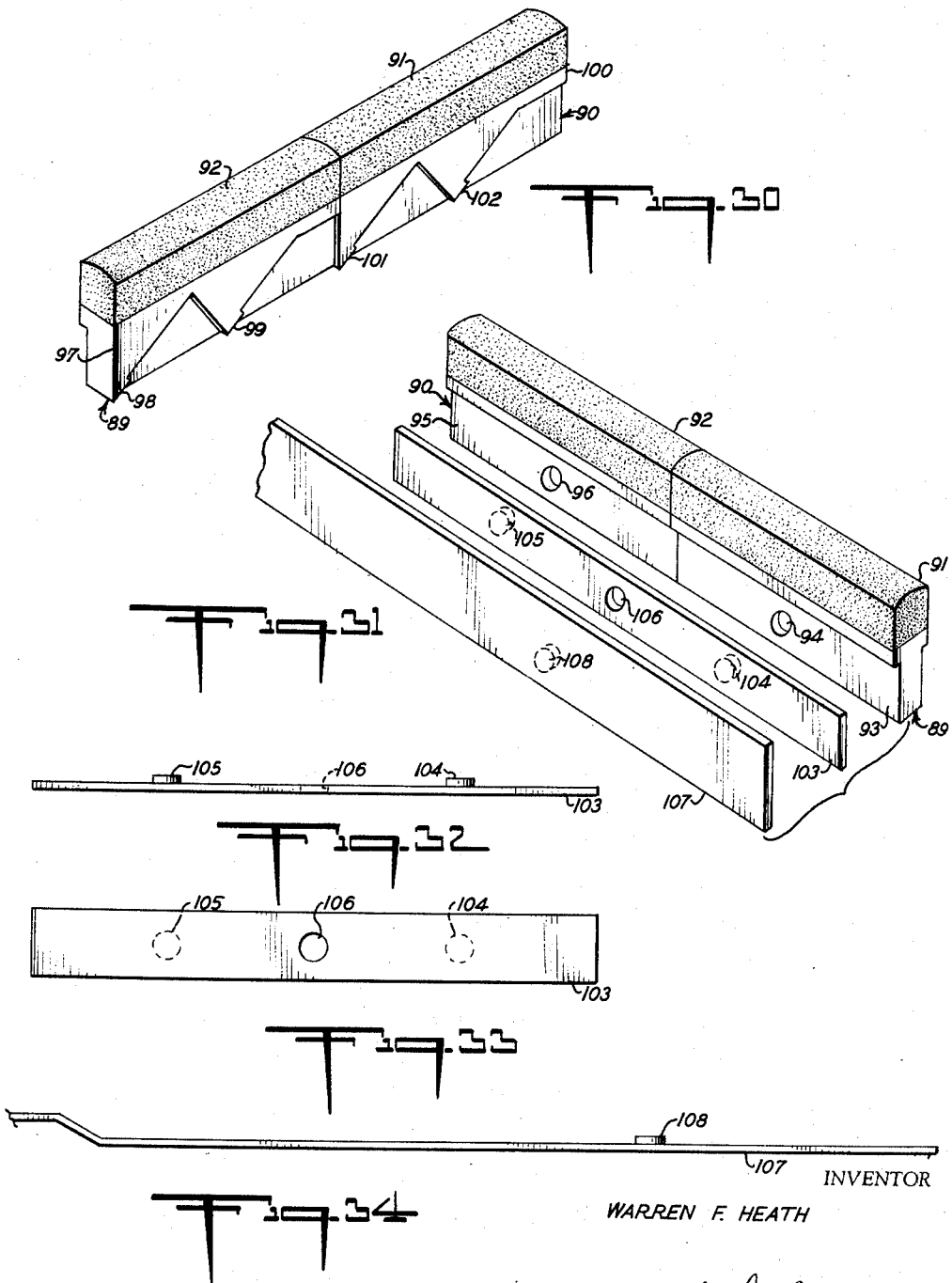
INVENTOR
WARREN F. HEATH
BY
Jacobi & Jacobi
ATTORNEYS

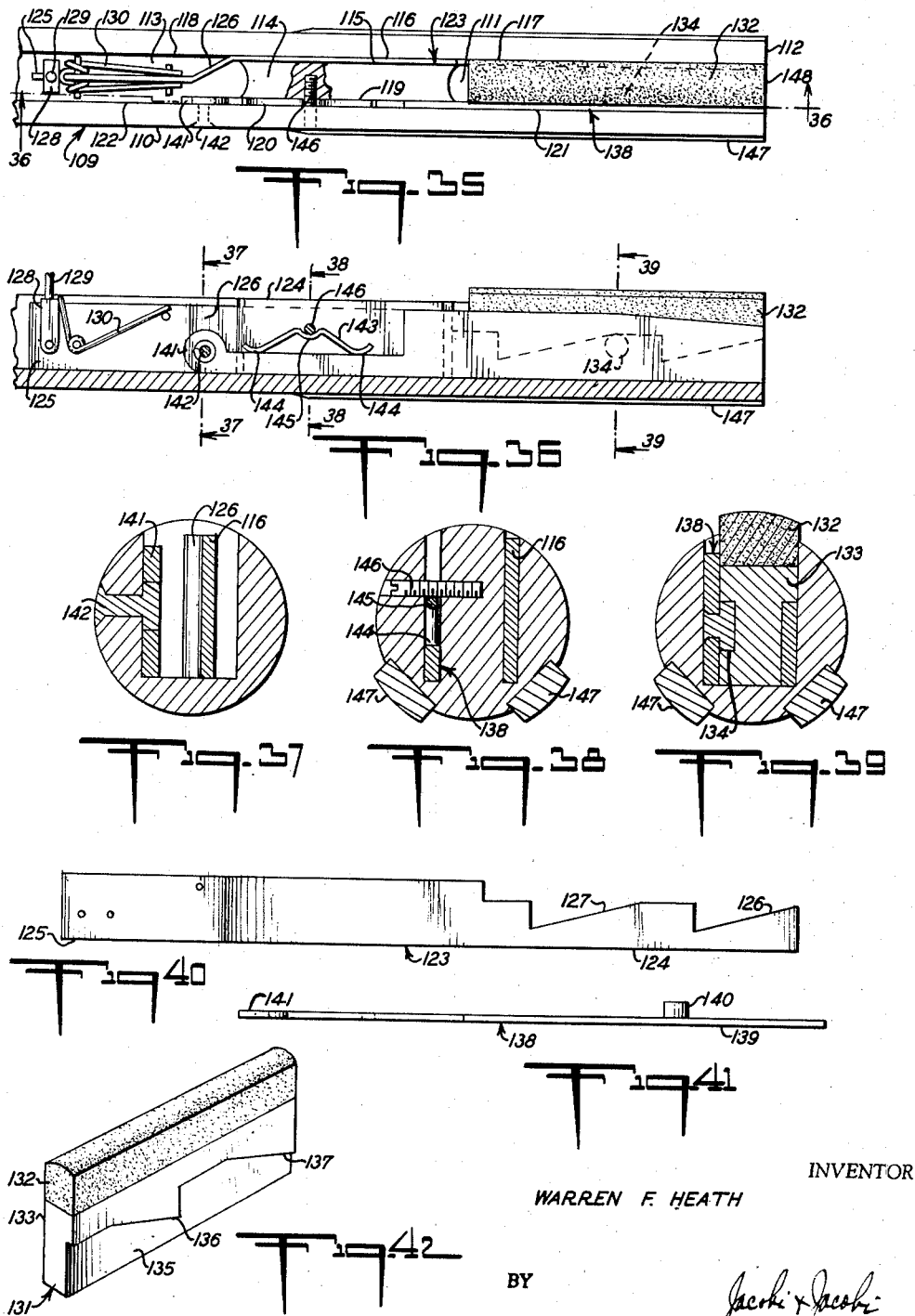

United States Patent Office 2,787,097
Patented Apr. 2, 1957

2,787,097

HONING MANDREL

Warren F. Heath, Colorado Springs, Colo.

Application July 11, 1955, Serial No. 521,310

31 Claims. (Cl. 51—184.3)

This invention relates to machine tools and more particularly to a mandrel for use in honing operations, which mandrel is of relatively simple construction and yet, which may be utilized to provide a fine finish while maintaining extremely close tolerance.

Heretofore, many different types of honing mandrels have been proposed and utilized and many of these were objectionable, in that, they were extremely complicated and difficulty was experienced in providing the relatively small parts of sufficient strength to withstand vibration and wear and furthermore, the minimum diameter of such prior art mandrels was limited by the size of the component parts. Difficulty was likewise experienced in these previous mandrels in maintaining accurate adjustment of the abrasive stones and, in certain designs such stones tended to move radially outward of the mandrel when the same was withdrawn from a hole due to the centrifugal forces set up by rotation of the mandrel. As a result of these undesirable movements of the stone, the resulting honed hole frequently was tapered or bell-shaped and it was extremely difficult to finish such holes to the required dimensional tolerances.

It is accordingly an object of the present invention to provide a honing mandrel which may be economically manufactured from readily available materials and which may be inter-changeably mounted in existing honing machines without modification of such machines.

A further object of the invention is the provision of a honing mandrel requiring relatively few parts and in which such parts may be of such dimensions as to be contained in a mandrel of relatively small diameter, thus permitting the honing of relatively small holes.

A still further object of the invention is the provision of a honing mandrel incorporating elongated shoes which cooperate with the stone to provide a three point contact with the surface of the hole to be honed.

Another object of the invention is the provision of a honing mandrel in which adjustment of the stone is accomplished by longitudinal movement of the mandrel with relation to such stone, there being provided cooperating cam surfaces and resilient means for holding such surfaces in engagement, thereby maintaining the adjustment of the stone.

A further object of the invention is the provision of a honing mandrel in which the stone may be adjusted over a relatively wide range of diameters thereby permitting the honing of a large range of holes with the provision of a relatively few mandrels.

A still further object of the invention is the provision of a honing mandrel in which all of the parts fit together in relatively tight relationship in order to maintain accurate adjustment and also to prevent undue vibration or chatter thereby resulting in an extremely smooth or fine finish to the honed surface, as well as an accurate diameter.

Another object of the invention is the provision of a honing mandrel incorporating elongated shoes which cooperate with the stone to provide a three point contact with the surface to be honed and in which such shoes may be removed and replaced to compensate for wear.

A further object of the invention is the provision of a honing mandrel including cooperating cam surfaces for adjusting the diameter of the mandrel and in which one of the cam surfaces may be provided by a removable wedge-shaped plate secured in the mandrel.

A still further object of the invention is the provision of a honing mandrel in which a cam is provided in the mandrel and in which spaced surfaces are provided on a base block for holding the stone, which spaced surfaces cooperate with a cam surface to maintain the stone in accurate alignment and prevent tilting or undesired movement thereof, other than in the desired direction.

A further object of the invention is the provision of a honing mandrel in which a plurality of base blocks to which are secured stones may be placed end to end in the mandrel and in which a plurality of cam surfaces in the mandrel corporate with a plurality of surfaces on each base block to provide suitable adjustment of the stones, there also being provided means for preventing longitudinal movement of one base block and stone relative to the other.

A still further object of the invention is the provision of a honing mandrel in which any desired number of base blocks and stones may be utilized, in order to conveniently hone holes of different lengths.

A further object of the invention is the provision of a honing mandrel for honing blind holes in which the base block and stone terminate substantially in alignment with the forward end of the honing bar and in which such alignment is maintained regardless of the adjusted diameter of the stone.

A still further object of the invention is the provision of a honing mandrel for blind holes, in which adjustment of the stone is accomplished by longitudinal movement of a cam bar relative to the mandrel and in which the stone is maintained against relative movement with respect to the mandrel.

Another object of the invention is the provision of a mandrel for honing blind holes and incorporating a longitudinally movable cam bar for adjusting the effective diameter of the mandrel and also, incorporating means for maintaining surfaces on a base block supporting the stone in engagement with the cam surfaces on the cam bar, regardless of the speed of rotation of the mandrel or, whether or not, the mandrel is engaged in a hole to be honed.

Further objects and advantages of the invention will be apparent from the following description taken in conjunction with the accompanying drawing wherein:

Fig. 1 is a fragmentary elevational view of the chuck of a honing machine and showing a portion of a honing mandrel of this invention received therein;

Fig. 2, a sectional view taken substantially on the line 2—2 of Fig. 1, and showing one type of honing machine chuck and the manner of connecting the honing mandrel of this invention thereto;

Fig. 3, an end elevational view taken from the left side of Fig. 2;

Fig. 4, a view similar to Fig. 2 and showing a modified form of honing machine chuck and the manner of connecting the honing mandrel of this invention thereto;

Fig. 5, an elevational view of a honing mandrel constructed in accordance with this invention;

Fig. 6, a sectional view taken substantially on the line 6—6 of Fig. 5, and showing the internal structure and arrangement of parts in the mandrel of this invention;

Fig. 7, an end elevation as viewed from the left hand end of Fig. 5;

Fig. 8, a sectional view on the line 8—8 of Fig. 6;

Fig. 9, a sectional view on the line 9—9 of Fig. 6;

Fig. 10, a sectional view on the line 10—10 of Fig. 6;

Fig. 11, a sectional view on the line 11—11 of Fig. 6;

Fig. 12, a sectional view on the line 12—12 of Fig. 6;

Fig. 13, an end elevational view from the right hand end of Fig. 5;

Fig. 14, a top plan view of the adjusting member utilized to adjust the honing diameter of the mandrel of this invention;

Fig. 15, a side elevational view of the adjusting member shown in Fig. 14;

Fig. 16, a view in perspective showing a base block and abrasive stone mounted thereon;

Fig. 17, a view in perspective showing the base block and stone of Fig. 16 from the opposite side and further showing the spaced inclined surfaces cooperating with cam surfaces in the mandrel;

Fig. 18, a view in perspective showing a removable and replaceable shoe for use on the mandrel of this invention;

Fig. 19, a view in perspective showing a removable wedge-shaped cam plate which may be utilized in place of a shoulder provided in the mandrel of this invention;

Fig. 20, a fragmentary sectional view showing the manner of installation of the removable cam plate of Fig. 19;

Fig. 21, a fragmentary elevational view of a modified form of honing mandrel utilizing two stones placed in end to end relationship in the mandrel;

Fig. 22, a sectional view taken substantially 22—22 of Fig. 21;

Fig. 23, a sectional view on the line 23—23 of Fig. 22;

Fig. 24, a sectional view on the line 24—24 of Fig. 22;

Fig. 25, a sectional view on the line 25—25 of Fig. 22;

Fig. 26, a sectional view on the line 26—26 of Fig. 22;

Fig. 27, a sectional view on the line 27—27 of Fig. 22;

Fig. 28, a view in perspective showing the cam plate utilized in the modified form of the invention shown in Figs. 21 and 22;

Fig. 29, a fragmentary sectional view showing the manner of installation of the removable cam plate shown in Fig. 28;

Fig. 30, a view in perspective showing the base blocks and stones utilized in the modified form of the invention shown in Fig. 21, as well as the spaced inclined surfaces corporating with the cam shown in Fig. 28;

Fig. 31, an exploded view in perspective showing the base blocks and stones of Fig. 30, as well as the tie bar for preventing relative endwise movement between such stones and a portion of the adjusting member cooperating with the tie bar;

Fig. 32, a top plan view of the tie bar shown in Fig. 31;

Fig. 33, an elevational view of the tie bar shown in Fig. 32;

Fig. 34, a fragmentary top plan view of the adjusting member, a portion of which is shown in Fig. 31;

Fig. 35, a fragmentary elevational view showing a further modified form of the honing mandrel of this invention and particularly adapted for honing blind holes;

Fig. 36, a sectional view on the line 36—36 of Fig. 35;

Fig. 37, a sectional view on the line 37—37 of Fig. 36;

Fig. 38, a sectional view on the line 38—38 of Fig. 36;

Fig. 39, a sectional view on the line 39—39 of Fig. 36;

Fig. 40, a side elevational view of the cam bar utilized in the modified form of the invention shown in Figs. 35 and 36;

Fig. 41, a top plan view of the holding member utilized in the form of the invention shown in Figs. 35 and 36; and Fig. 42, a view in perspective showing the base block and stone utilized in the modified form of honing mandrel shown in Figs. 35 and 36.

With continued reference to the drawing and particularly Figs. 1, 2 and 3, there is shown the chuck of a conventional honing machine which may well comprise an elongated tubular member 10 provided with a bushing 11 slidably mounted therein, which bushing is provided with a socket 12, the purpose of which will be presently described. The bushing 11 is also provided at the rear end thereof, with a coupling member 13 for releasably securing the same to a rod 14 constituting a portion of the adjusting mechanism of the honing machine. At the forward end of the tubular member 10, there is mounted a clamping cap 15 having an inwardly extending flange 16 and the cap 15 is provided with a cam slot 17 cooperating with the head 18 of a screw threaded member 19 mounted in the tubular member 10, the cap 15 being utilized in a manner to be later described. The screw threaded member 19 also serves to secure in place in the forward end of the tubular member 10, a bushing 20 and such bushing 20, as well as the socket 12 in the bushing 11 serve to receive the mandrel 21 of this invention, such mandrel being secured in place by a screw threaded member 22 extending through the bushing 11 and the mandrel 21 with the head 23 of the screw threaded member 22 being received in an elongated slot 24 in the tubular member 10.

A modified form of honing machine chuck is shown in Fig. 4, there being provided an elongated tubular member 25 on the forward end of which is mounted a clamping cap 26, such cap also being provided with a cam slot 27 cooperating with the head of a screw threaded member 28 in the same manner, as described above, in connection with the structure shown in Figs. 1 and 2. Slidably received within the tubular member 25 is a bushing 29 having a socket 30 in the forward end thereof and such socket serves to receive and support the mandrel 21 of this invention. Relative rotation between the bushing 29 and the mandrel 21 is prevented by a pin 31 extending through the bushing 29 and engaging suitable means on the rear end of the mandrel 21, which means will be later described. The bushing 29 forms a continuation of a rod 32 which is a part of the adjusting mechanism of the conventional honing machine.

With particular reference to Figs. 5 to 17, there is shown one form of honing mandrel 21 constructed in accordance with this invention and which may well comprise an elongated bar 33 of suitable diameter, such bar being provided, at the rear end thereof, with a bayonet slot 34 for engaging the pin 31 shown in Fig. 4, and a transverse aperture 35 for engaging the screw threaded member 22, which is shown in Fig. 2. The bar 33 is provided with an elongated recess 36 terminating adjacent the forward end 37 of the bar 33 and, as will be seen, the recess 36 is radially disposed in the bar 33 and extends for a substantial distance into the bar. There is also provided a second elongated recess 38 in the rear portion of the bar and such recess terminates in spaced relation to the recess 36, thereby providing a shoulder 39 between the recess 36 and the recess 38. A relatively narrow groove 40 extends through the shoulder 39 and connects the recesses 36 and 38 with one wall 41 of the groove 40 forming a continuation of the wall 42 of the recess 36 and a continuation of the wall 43 of the recess 38.

Formed in the wall 44 of the recess 36 is a shoulder 45 and such shoulder is inclined downwardly from the shoulder 39 to the bottom 46 of the recess 36 at a point inwardly spaced from the outer end of the recess 36. The shoulder 45 provides an inclined cam surface 47, the purpose of which will be presently described.

As best shown in Figs. 16 and 17, a rectangular base block 48 is provided for receiving and supporting an abrasive stone 49 and such stone may be secured to the edge 50 of the base block 48 in any suitable manner, such as by a suitable adhesive. The abrading surface 51 of the stone 49 may, of course, be dressed in any desired manner to provide a suitable curvature or shape for the particular surface to be honed. The base block 48 is provided in the side wall 52 thereof, with a socket 53, the purpose of which will be presently described and the opposite side wall 54 of the base block 48 is machined to provide two spaced inclined surfaces 55 and 56 which serve to cooperate with the cam surface 47 of the shoulder 45 in a manner to be presently described.

The base block 48 and stone 49 are slidably received in the recess 36 with the inclined surfaces 55 and 56 in engagement with the cam surface 47 of the shoulder 45. Provided on the bar 33 of the mandrel 21, are a pair of elongated shoes 57 which cooperate with the honing surface 51 of the stone 59 to provide a three point contact with the surface to be honed. The shoes 57 may be formed from any suitable material, such as tungsten carbide or a suitable ceramic material and since the honing mandrel of this invention is utilized in the presence of an adequate supply of coolant and lubricant, there is little appreciable wear of the shoes 57. However, if desired, as shown in Fig. 18, the shoes 57 may be provided with apertures 58 adjacent each end thereof for receiving suitable fastening means to secure the same in place on the bar 33 of the mandrel 31, thereby rendering the shoes 57 replaceable, if undue wear takes place.

In order to properly adjust the base block 48 and stone 49 carried thereby and to maintain the inclined surfaces 55 and 56, in firm engagement with the cam surface 47, there is provided a flat elongated adjusting member disposed in the recess 36 between the side wall 52 of the base block 48 and the side wall 42 of the recess 36. The adjusting member 59 is provided with a pin 60 which is received in the socket 53 of the base block 48. It is also to be noted, that the forward end of the adjusting member 59 is provided with a tapered surface 61, which serves to prevent engagement of the forward end of the adjusting member 59, with the surface to be honed when the stone 49 is adjusted for maximum diameter.

The adjusting member 59 extends through the groove 40 into the recess 38 and is provided with an offset portion 62, in order that the rear portion 63 of the adjusting member 59 will be disposed substantially along the longitudinal axis of the bar 33. Pivotally mounted adjacent the rear end 63 of the adjusting member 59 is a yoke 64 from the upper end of which projects a stud 65, the purpose of which will presently appear. A coil spring 66 is mounted on a pin 67 extending through the rear portion 63 of the adjusting member 59, and one end 68 of the spring 66 engages the yoke 64, while the other end 69 engages a pin 70 extending through the adjusting member 59. Spring 66 operates to move the yoke 64 and stud 65 carried thereby, counterclockwise with respect to the adjusting member 59, as viewed in Fig. 6. The purpose of spring 66 will be presently described.

In operation, the honing mandrel, above described, is installed in the chuck of a honing machine by insertion of the rear end of the bar 33 through the flange 16 of the cap 15 and through the bushing 20 and into the socket 12 of the bushing 11. The bar 33 is secured in place by insertion of the screw threaded member 22 through the aperture 35 and the bar 33. A base block 48 with stone 49 carried thereby is connected to the adjusting member 59 by insertion of the pin 60 in the socket 53 and the forward end 63 of the adjusting member 59 is placed in the recess 38 with the stud 65 inserted through a slot, not shown, in the flange 16 of the cap 15, and upon rotation of the cap 15, cooperation of the cam slot 17 with the head 18 of the screw threaded member 19 will move the flange 16 of the cap 15 rearwardly, and clamp the stud 65 firmly in a groove or recess 71 provided, either in the bushing 70 or in the flange 16 of the cap 15. This operation serves to securely hold the stud 65 and yoke 64 substantially perpendicular to the longitudinal axis of the bar 33 and, at the same time, prevent longitudinal movement of the yoke 64 and adjusting member 59 attached thereto with relation to the tubular member 10 of the honing machine chuck. Thereafter, the adjusting member 59 and base block 48 and stone 49 carried thereby, may be moved about the pivotal mounting of the yoke 64 and downwardly into the recess 36 until the inclined surfaces 55 and 56 on the base block 48 firmly engage the cam surface 47 of the shoulder 45. Thereafter, such surfaces will be maintained in firm engagement by action of the spring 66, as will be clear from an inspection of Fig. 6 of the drawing.

The effective honing diameter of the mandrel, above described, may be adjusted by operation of the adjusting mechanism of the honing machine which serves to move the bar 14 in either direction thereby moving the bar 33 of the mandrel 21 and since the base block 48 and stone 49 are retained against longitudinal movement with respect to the tubular member 10 of the chuck of the honing machine, by the stud 65, this will result in relative movement between the inclined surfaces 55 and 56 on the base block 58 and the cam surface 47 thereby moving the stone 51 outwardly or inwardly, in a radial direction with respect to the axis of the bar 33. Regardless of the movement of the base block 48, the spring 66 will act to hold the cooperating surfaces in firm engagement and the spring 66 is of sufficient strength to resist any outward movement of the block 48 and stone carried thereby, by reason of centrifugal forces set up due to rotation of the bar 33. The thickness of the base block 48 is so selected that together with the adjusting member 59, the assembly will have a firm engagement against the side walls 42 and 44 of the recess 36, thereby preventing play and vibration and furthermore, vibration is also prevented by the action of spring 66. This results in providing a smooth fine finish on the surface of the hole to be honed which would not be the case, were the stone 49 permitted to vibrate or chatter in the bar 33.

It will be seen that by the above described hone of the invention, there has been provided a honing mandrel utilizing relatively few and easily manufactured parts which will, nevertheless, operate to hone holes of any desired diameter within the range of the tool and, in which the parts may be of such dimensions as to permit the honing of holes of relatively small diameter. It will also be seen, that the honing mandrel may be conveniently installed and removed from a conventional honing machine and that the stone and base block upon which the same is mounted, may be conveniently removed for replacement, when necessary.

Since the cam surface 47 of the shoulder 45 may be subject to some wear, it is sometimes desirable, to provide the mandrel of this invention with a replaceable cam surface and, as shown in Figs. 19 and 20, this may be conveniently accomplished by provision of a removable cam plate in the form of a wedge-shaped member 72 having a cam surface 73 thereon and being provided with apertures 74 for receiving suitable fastening means, such as screw threaded members 75 which extend through the apertures 74 and engage in the wall 44 of the recess 36 in the bar 33. In order to provide convenient access to the screw threaded fastening means 75, there may be provided apertures 76 in the wall 42 of the recess 36 in the bar 33, and in order to install or remove the cam plate 72, a screwdriver may be inserted through the apertures 76. The cam plate 72 may be formed of metal, of any desired hardness, thereby maintaining wear at a minimum.

Where it is necessary to hone relatively long holes, it is desirable to provide a plurality of stones arranged in end to end relationship, since this results in providing a better finish on the holes and also results in more even wear of the stones thereby maintaining the desired dimensional characteristics of the hole to be honed. Furthermore, with a multiple arrangement of stones, it is more convenient to prevent tilting of such stones in the mandrel, thereby preventing tapering or bowing of the holes to be honed, and furthermore, in case of breakage, it is only necessary to replace a relatively inexpensive short stone and base block, rather than a single stone and base block of sufficient length to cover the entire surface to be honed.

In accordance with this object, there is shown in Figs.

21 to 34, a modified form of mandrel construction, in which it is to be assumed that the mandrel 77 is provided with means at the rear end thereof, to install and connect the same to the conventional chuck of a honing machine, as described above, in connection with the first form of the invention. The mandrel 77 may well comprise an elongated bar 78 having an elongated recess 79 formed therein, which recess terminates inwardly of the forward end 80 of the bar 78. Secured to one wall 81 of the recess 79, is a cam plate 82 and, as best shown in Fig. 28, cam plate 82 may be provided with spaced pairs of cam surfaces 83 and 84. Also provided in the cam plate 82 are apertures 85 for receiving screw threaded or other suitable fastening means 86 which engage in the wall 81 of the recess 79 of the bar 78 to removably secure the cam plate 82 in position therein. In order to provide access to the screw threaded fastening means 86, there may be provided in the wall 87 of the recess 79, apertures 88 which will permit the convenient insertion of a screwdriver.

As best shown in Figs. 30 and 31, a pair of base blocks 89 and 90 serve to receive and mount abrasive stones 91 and 92 respectively, which are secured thereto in any desired manner, such as by a suitable adhesive, and the side wall 93 of the base block 89 is provided, substantially midway of the length thereof, with a socket 94 while the side wall 95 of the base block 90 is provided substantially midway of the length thereof with a socket 96. The opposite side wall 97 of the base block 89 is provided with spaced inclined surfaces 98 and 99, while the opposite wall 100 of the base block 90 is provided with spaced inclined surfaces 101 and 102.

In order to prevent endwise movement of one base block 89 with relation to the other base block 90, there is provided a tie bar 103 having a pin 104 adapted to be received in the socket 94 and a second pin 105 adapted to be received in the socket 96. Thus, as will be seen, with the tie bar 103 in place, the pins 104 and 105 engaging in the sockets 94 and 96, will prevent relative endwise movement of the base blocks 89 and 90. The tie bar 103 is also provided with an aperture 106 located substantially midway between the pins 104 and 105.

A flat elongated adjusting member 107 which is substantially identical with the adjusting member 59, described above in connection with the first form of the invention, is provided, and on the adjusting member 107 is a pin 108 which is adapted to engage in the aperture 106 in the tie bar 102. It is to be understood, that the adjusting member 107 will be provided, at the rear end thereof, with a yoke and stud arrangement similar to that described above, as well as a spring operating to pivot the yoke and stud in a counter-clockwise direction relative to the adjusting member 107.

In operation, the two stones, described above, are assembled in end to end relationship with the tie bar 103 in place to secure the same in such relationship and with the pin 108 of the adjusting member 107 engaged in the aperture 106 in the tie bar 103, this assembly is installed in the bar 78 which has already been mounted in the chuck of the honing machine. The installation of the rear end of the adjusting member 107 with the stud thereon, is the same as that described above, in connection with the first form of the invention and the base block and stone assembly is then moved downwardly into the recess 79 with the inclined surfaces 98 and 99 on the base block 97 engaging the cam surfaces 83 on the cam plate 82 and with the inclined surfaces 101 and 102 on the base block 90 engaging the cam surfaces 84 on the cam plate 82. Adjustment of the effective diameter of this form of the honing mandrel is the same as that described above and, of course, the spring engaging the yoke and adjusting member 107 will operate to hold the inclined surfaces in engagement with the cam surfaces on the cam plate 82. Either base block 89 or base block 90, together with the stones carried thereby, may be removed and replaced and likewise, if desired, a longer cam plate having additional cam surfaces and additional base blocks and stones may be utilized, in order to provide a mandrel for honing holes of any desired length.

Since, it is often desirable to hone blind holes, that is, holes open only at one end, it is necessary to provide for this operation a honing mandrel in which the stone is in alignment with the forward end of such mandrel and in which no part of the same projects beyond the forward end thereof. With particular reference to Figs. 35 to 42, there is shown a honing mandrel particularly designed to be utilized in honing such blind holes in this mandrel 109, may well comprise an elongated bar 110, having an elongated recess 111, in the forward portion thereof, which recess opens at the side and forward end 112 of the bar 110. A second elongated recess 113 is provided in the rear portion of the bar 110 and it is to be assumed, that the bar 110 will be provided with the necessary structure to mount the same in a conventional honing machine chuck, as described above in connection with the first form of the invention. The second elongated recess 113 terminates in spaced relation to the recess 111, thereby providing a shoulder 114 separating such recesses. A groove 115 is provided in the shoulder 114 connecting recess 111 and 113 and with the side wall 116 of the groove 115 forming a continuation of the side wall 117 of the recess 111 and a continuation of the side wall 118 of the recess 113. In the opposite side of the shoulder 114, there is provided a groove 119 connecting the recesses 111 and 113 and the side wall 120 of the groove 119 forms a continuation of the side wall 121 of the recess 111 and a continuation of the side wall 122 of the recess 113.

A flat elongated cam bar 123 is slidably disposed in the groove 115 and the forward portion 124 of the cam bar 123 extends into the recess 111 in engagement with the side wall 117 of such recess and the rear portion 125 of the cam bar 123 is offset at 126 and extends into the recess 113 and is disposed substantially along the longitudinal center line of the bar 110. As best shown in Fig. 40, the forward end 124 of the cam bar 123 is provided with spaced inclined cam surfaces 126 and 127, the purpose of which will presently appear.

The rear end 125 of the cam bar 123 is provided with a pivotally mounted yoke 128, a stud 129 projecting therefrom and a spring 130 which is identical with the structure described above, in connection with the first form of the invention.

A base block 131 having an abrading stone 132 mounted thereon, in any desired manner, such as by a suitable adhesive, is provided in the wall 133 thereof, with a socket 134 and on the opposite side wall 135 with spaced inclined surfaces 136 and 137.

A flat elongated holding member 138 is provided with a forward portion 139 having a pin 140 disposed in the recess 111 and the holding member 138 extends through the groove 119 in the shoulder 114 with the rear end 141 of the holding member 138 disposed in the recess 113 and pivotally mounted on the bar 110 by a pivot pin 142 extending through the bar 110 and into an aperture in the rear portion 141 of the holding member 138.

The base block 131 and stone 132 carried thereby is installed in the recess 111 with the pin 140 of the holding member 138 engaged in the socket 134 of the base block 131 and with the inclined surfaces 136 and 137 engaging the cam surfaces 126 and 127 respectively on the cam bar 123. Disposed in the groove 119 is a spring 143 with the end portions 144 engaging the upper surface of the holding member 138 and with the central portion 145 of the spring 143 engaging a screw threaded member 146 extending through the bar 110 and into the shoulder 114. Spring 143 serves to hold the member 138 and base block 131 with the inclined surfaces 136 and 137 in firm engagement with the cam surfaces 126 and 127 and, at the same time, permits outward movement radially of the bar 110 of the base block 131 and stone 132, in order to adjust the effective honing diameter of the mandrel. The bar 110 is also provided with elongated shoes 147 which cooperate with the stone 132 to provide a three point contact with the surface of the hole to be honed in the same manner as described above, in connection with the first form of the invention. It is also to be noted, that the end 148 of the stone 132 is in alignment with the end 112 of the bar 110 and since, the stone 132 does not move longitudinally with respect to the bar 110, honing operations in blind holes may be performed with the entire surface of such holes subject to the action of the stone.

In operation, when it is desired to adjust the honing diameter of the mandrel, the adjusting mechanism of the honing machine is operated to move the bar 110 of the mandrel 109 longitudinally, and since, the cam bar 123 is held against such longitudinal movement by the stud 129 and yoke 128, relative movement between the cam surfaces 126 and 127, and the inclined surfaces 136 and 137 on the base block 134 will take place, thereby resulting in inward or outward movement of the base block 131 and stone 132 carried thereby. At no time, does the cam bar 123 or any other portion of the mechanism project beyond the forward end 112 of the bar 110 and consequently, honing operations at the bottom of a blind hole may be carried out without interference.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar terminating adjacent the forward end thereof, a second elongated recess in the rear end of said bar and terminating in spaced relation to said first recess, a relatively narrow groove connecting said recesses with one wall of said groove forming a continuation of one side wall of both recesses, a shoulder on the opposite wall of said first recess, said shoulder being downwardly inclined toward the front end of said first recess to provide a cam surface, a base block received in said first recess and having spaced inclined surfaces engaging said cam surface, a stone mounted on said base block and projecting from said first recess radially of said bar, a socket in the side of said base block facing said one side wall, a flat elongated adjusting member disposed in said first recess between said base block and said one side wall, a pin on said member received in said socket, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said spaced inclined surfaces in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

2. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar terminating adjacent the forward end thereof, a second elongated recess in the rear end of said bar and terminating in spaced relation to said first recess, a groove connecting said recesses with one wall of said groove forming a continuation of one side wall of both recesses, a shoulder on the opposite wall of said first recess, said shoulder being downwardly inclined toward the front end of said first recess to provide a cam surface, a base block received in said first recess and having spaced inclined surfaces engaging said cam surface, a stone mounted on said base block and projecting from said first recess radially of said bar, a socket in the side of said base block facing said one side wall, a flat elongated adjusting member disposed in said first recess between said base block and said one side wall, a pin on said member received in said socket, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stone to provide a threepoint engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said spaced inclined surfaces in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

3. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar terminating adjacent the forward end thereof, a second elongated recess in the rear end of said bar and terminating in spaced relation to said first recess, a groove connecting said recesses with one wall of said groove forming a continuation of one side wall of both recesses, a shoulder on the opposite wall of said first recess, said shoulder being inclined to provide a cam surface, a base block received in said first recess and having spaced inclined surfaces engaging said cam surface, a stone mounted on said base block and projecting from said first recess radially of said bar, a socket in the side of said base block facing said one side wall, a pin on said member received in said socket, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said spaced inclined surfaces in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

4. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar terminating adjacent the forward end thereof, a second elongated recess in the rear end of said bar and terminating in spaced relation to said first recess, a groove connecting said recesses with one wall of said groove forming a continuation of one side wall of both recesses, a shoulder on the opposite wall of said first recess, said shoulder being inclined to provide a cam surface, a base block received in said first recess and having spaced inclined surfaces engaging said cam surface, a stone mounted on said base block and projecting from said first recess radially of said bar, a socket in the side of said base block facing said one side wall, an elongated adjusting member disposed in said first recess between said base block and said one side wall, a pin on said member received in said socket, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said spaced inclined surfaces in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

5. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar terminating adjacent the forward end thereof, a second elongated recess in the rear end of said bar and terminating in spaced relation to said first recess, a groove connecting said recesses with one wall of said groove forming a continuation of one side wall of both recesses, a shoulder on the opposite wall of said first recess, said shoulder being inclined to provide a cam surface, a base block received in said first recess and having spaced inclined surfaces engaging said cam surface, a stone mounted on said base block and projecting from said first recess radially of said bar, a socket in the side of said base block facing said one side wall, an elongated adjusting member disposed in said first recess between said base block and said one side wall, a pin on said member received in said socket, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke and prevent longitudinal movement of said member relative to said chuck and spring means engaging said member and said yoke to hold said spaced inclined surfaces in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

6. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses, a shoulder on one wall of said first recess, said shoulder being inclined to provide a cam surface, a base block received in said first recess and having spaced inclined surfaces engaging said cam surface, a stone mounted on said base block and projecting from said first recess radially of said bar, a socket in the side of said base block opposite said one wall, an elongated adjusting member disposed in said first recess between said base block and the opposite wall, a pin on said member received in said socket, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke and prevent longitudinal movement of said member relative to said chuck and spring means engaging said member and said yoke to hold said spaced inclined surfaces in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

7. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses, a shoulder on one wall of said first recess, said shoulder being inclined to provide a cam surface, a base block received in said first recess and having spaced inclined surfaces engaging said cam surface, a stone mounted on said base block and projecting from said first recess radially of said bar, a socket in the side of said base block opposite said one wall, an elongated adjusting member disposed in said first recess between said base block and the opposite wall, a pin on said member received in said socket, said member extending through said groove and into said second recess, a yoke pivotally mounted on the rear end of said member, a stud on said yoke projecting outwardly from said second recess radially of said bar, said stud providing means engageable with said chuck to hold said stud and yoke and prevent longitudinal movement of said member relative to said chuck and spring means engaging said member and said yoke to hold said spaced inclined surfaces in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

8. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses, a shoulder on one wall of said first recess, said shoulder being inclined to provide a cam surface, a base block received in said first recess and having an inclined surface engaging said cam surface, a stone mounted on said base block and projecting from said first recess radially of said bar, a socket in the side of said base block opposite said one wall, an elongated adjusting member disposed in said first recess between said base block and the opposite wall, a pin on said member received in said socket, said member extending through said groove and into said second recess, a yoke pivotally mounted on the rear end of said member, a stud on said yoke projecting outwardly from said second recess radially of said bar, said stud providing means engageable with said chuck to hold said stud and yoke and prevent longitudinal movement of said member relative to said chuck and spring means engaging said member and said yoke to hold said inclined surface in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

9. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses, a shoulder on one wall of said first recess, said shoulder being inclined to provide a cam surface, a base block received in said first recess and having an inclined surface engaging said cam surface, a stone mounted on said base block and projecting from said first recess radially of said bar, an elongated adjusting member disposed in said first recess between said base block and the opposite wall, means on said member for releasably connecting the same to said base block, said member extending through said groove and into said second recess, a yoke pivotally mounted on the rear end of said member, a stud on said yoke projecting outwardly from said second recess radially of said bar, said stud providing means engageable with said chuck to hold said stud and yoke and prevent longitudinal movement of said member relative to said chuck and spring means engaging said member and said yoke to hold said inclined surface in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

10. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses, a shoulder on one wall of said first recess, said shoulder being inclined to provide a cam surface, a base block received in said first recess and having an inclined surface engaging said cam surface, a stone mounted on said base block and projecting from said first recess radially of said bar, an elongated adjusting member disposed in said first recess between said base block and the opposite wall, means on said member for connecting the same to said base block, said member extending through said groove and into said second recess, a stud pivotally mounted on the rear end of said member and projecting outwardly from said second recess radially of said bar, said stud providing means engageable with said chuck to hold said stud and prevent longitudinal movement of said member relative to said chuck and spring means engaging said member and said stud to hold said inclined surface in engagement with said cam surface whereby upon operation of said adjusting mechanism to move said bar longitudinally said adjusting member will hold said base block stationary, the resulting relative movement between said base block and said cam surface serving to move said stone radially of said bar to adjust the honing diameter of said mandrel.

11. A honing mandrel as defined in claim 10, in which said shoulder is provided by a removable wedge-shaped member secured to said one wall of said first recess by screw threaded fastening means and apertures in said opposite wall to provide access to said fastening means.

12. A honing mandrel as defined in claim 10, in which said shoulder is provided by a removable wedge-shaped member removably secured to said one wall of said first recess.

13. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar terminating adjacent the forward end thereof, a second elongated recess in the rear end of said bar and terminating in spaced relation to said first recess, a relatively narrow groove connecting said recesses with one wall of said groove forming a continuation of one side wall of both recesses, a cam plate removably secured to the opposite wall of said first recess by screw threaded fastening means, apertures in said one side wall to provide access to said fastening means, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a socket in the side of each base block facing said one side wall, a tie bar disposed between said base blocks and said one side wall, spaced pins on said tie bar received in said sockets to prevent longitudinal movement of one base block with respect to the other, an aperture in said tie bar substantially midway between said pins, a flat elongated adjusting member disposed in said first recess between said tie bar and said one side wall, a pin on said member received in said last named aperture, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating wtih said stones to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

14. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar terminating adjacent the forward end thereof, a second elongated recess in the rear end of said bar and terminating in spaced relation to said first recess, a relatively narrow groove connecting said recesses with one wall of said groove forming a continuation of one side wall of both recesses, a cam plate removably secured to the opposite wall of said first recess, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a socket in the side of each base block facing said one side wall, a tie bar disposed between said base blocks and said one side wall, spaced pins on said tie bar received in said sockets to prevent longitudinal movement of one base block with respect to the other an aperture in said tie bar substantially midway between said pins, a flat elongated adjusting member disposed in said first recess between said tie bar and said one side wall, a pin on said member received in said last named aperture, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stones to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

15. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a relatively narrow groove connecting said recesses with one wall of said groove forming a continuation of one side wall of both recesses, a cam plate removably secured to the opposite wall of said first recess, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a socket in the side of each base block facing said one side wall, a tie bar disposed between said base blocks and said one side wall, spaced pins on said tie bar received in said sockets to prevent longitudinal movement of one base block with respect to the other, an aperture in said tie bar substantially midway between said pins, a flat elongated adjusting member disposed in said first recess between said tie bar and said one side wall, a pin on said member received in said last named aperture, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stones to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

16. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses with one wall of said groove forming a continuation of one side wall of both recesses, a cam plate removably secured to the opposite wall of said first recess, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a socket in the side of each base block facing said one side wall, a tie bar disposed between said base blocks and said one side wall, spaced pins on said tie bar received in said sockets to prevent longitudinal movement of one base block with respect to the other, an aperture in said tie bar substantially midway between said pins, a flat elongated adjusting member disposed in said first recess between said tie bar and said one side wall, a pin on said member received in said last named aperture, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stones to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

17. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses with one wall of said groove forming a continuation of one side wall of both recesses, a cam plate removably secured to the opposite wall of said first recess, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a tie bar disposed between said base blocks and said one side wall, means on said tie bar engaging said base blocks to prevent longitudinal movement of one base block with respect to the other, an aperture in said tie bar substantially midway between said last named means, a flat elongated adjusting member disposed in said first recess between said tie bar and said one side wall, a pin on said member received in said last named aperture, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stones to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

18. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses with one wall of said groove forming a continuation of one side wall of both recesses, a cam plate removably secured to the opposite wall of said first recess, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a tie bar disposed between said base blocks and said one side wall, means on said tie bar engaging said base blocks to prevent longitudinal movement of one base block with respect to the other, a flat elongated adjusting member disposed in said first recess between said tie bar and said one side wall, means on said member releasably connecting the same to said tie bar, said member extending through said groove and into said second recess, a yoke pivotally mounted on the rear end of said member, a stud on said yoke projecting outwardly from said second recess radially of said bar, angularly spaced elongated shoes secured to the forward portion of said bar and cooperating with said stones to provide a three point engagement with the surface of a hole to be honed, said stud providing means engageable with said chuck to hold said stud and yoke substantially perpendicular to the longitudinal axis of said bar and prevent longitudinal movement of said member relative to said chuck and spring means engaging said member and said yoke to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

19. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses with one wall of said groove forming a continuation of one side wall of both recesses, a cam plate removably secured to the opposite wall of said first recess, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a tie bar disposed between said base blocks and said one side wall, means on said tie bar engaging said base blocks to prevent longitudinal movement of one base block with respect to the other, a flat elongated adjusting member disposed in said first recess between said tie bar and said one side wall, means on said member releasably connecting the same to said tie bar, said member extending through said groove and into said second recess, a yoke pivotally mounted on the rear end of said member, a stud on said yoke projecting outwardly from said second recess radially of said bar, said stud providing means engageable with said chuck to hold said stud and yoke substantially perpendicular to the longitudinal axis of said bar and prevent longitudinal movement of said member relative to said chuck and spring means engaging said member and said yoke to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

20. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses with one wall of said groove forming a continuation of one side wall of both recesses, a cam plate removably secured to the opposite wall of said first recess, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a tie bar disposed between said base blocks and said one side wall, means on said tie bar engaging said base blocks to prevent longitudinal movement of one base block with respect to the other, a flat elongated adjusting member disposed in said first recess between said tie bar and said one side wall, means on said member releasably connecting the same to said tie bar, said member extending through said groove and into said second recess, a stud pivotally mounted on the rear end of said member and projecting outwardly from said second recess radially of said bar, said stud providing means engageable with said chuck to hold said stud and prevent longitudinal movement of said member relative to said chuck and spring means engaging said member and said stud to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

21. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses, a cam plate removably secured to one wall of said first recess, two pairs of inclined cam surfaces on said cam plate, a pair of base blocks received in said first recess in end to end relationship, each block having a pair of spaced inclined surfaces engaging one pair of said cam surfaces, a stone mounted on each base block and projecting from said first recess radially of said bar, a tie bar disposed between said base blocks and the opposite wall, means on said tie bar engaging said base blocks to prevent longitudinal movement of one base block with respect to the other, a flat elongated adjusting member disposed in said first recess between said tie bar and said opposite wall, means on said member releasably connecting the same to said tie bar, said member extending through said groove and into said second recess, a stud pivotally mounted on the rear end of said member and projecting outwardly from said second recess radially of said bar, said stud providing means engageable with said chuck to hold said stud and prevent longitudinal movement of said member relative to said chuck and spring means engaging said member and said stud to hold said inclined surfaces on each block in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

22. A honing mandrel comprising an elongated bar with the rear end adapted to be received in the chuck of a honing machine for rotation therewith, means on the rear end of said bar for releasably securing the same to the adjusting mechanism of said honing machine, an elongated recess in said bar, a second elongated recess in the rear end of said bar and terminating in spaced relation to said first recess, a groove connecting said recesses, a cam plate removably secured to one wall of said first recess, inclined cam surfaces on said cam plate, a pair of base blocks received in said first recess in end to end relationship, each block having an inclined surface engaging said cam surface, a stone mounted on each base block and projecting from said first recess radially of said bar, a tie bar disposed between said base blocks and the opposite wall, means on said tie bar engaging said base blocks to prevent longitudinal movement of one base block with respect to the other, a flat elongated adjusting member disposed in said first recess between said tie bar and said opposite wall, means on said member releasably connecting the same to said tie bar, said member extending through said groove and into said second recess, a stud pivotally mounted on the rear end of said member and projecting outwardly from said second recess radially of said bar, said stud providing means engageable with said chuck to hold said stud and prevent longitudinal movement of said member relative to said chuck and spring means engaging said member and said stud to hold said inclined surfaces in engagement with said cam surfaces whereby upon operation of said adjusting mechanism to move said bar longitudinally said adjusting member will hold said base blocks stationary, the resulting relative movement between said base blocks and said cam surfaces serving to move said stones radially of said bar to adjust the honing diameter of said mandrel.

23. A honing mandrel for blind holes comprising an elongated bar with the rear end adapted to be received in the chuck of a honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a relatively narrow groove connecting said recesses with one wall of said groove forming a continuation of one side wall of both recesses, a second relatively narrow groove connecting said recesses with one wall of said second groove forming a continuation of the opposite side wall of both recesses, a flat elongated cam bar slidably disposed in said second groove with a forward portion extending into said first recess in engagement with said opposite side wall and with a rear portion extending into said second recess, spaced inclined cam surfaces on the forward portion of said cam bar, a base block received in said first recess and having spaced inclined surfaces engaging said cam surfaces, a stone mounted on said base block and projecting from said first recess radially of said bar, the forward end of said stone and said base block terminating in alignment with the forward end of said bar, a socket in the side of said base block facing said one side wall, a flat elongated holding member disposed in said first recess between said base block and said one side wall, a pin on said member received in said socket, said member extending through said first groove and terminating in said second recess, means pivotally mounting the end of said member in said second recess on said bar, spring means removably mounted in said first groove and engaging said member to hold said inclined surfaces on said base block in engagement with said cam surfaces, said holding member serving to prevent relative longitudinal movement between said base block and said bar, a yoke pivotally mounted on the rear end of said cam bar, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke substantially perpendicular to the longitudinal axis of said bar and prevent longitudinal movement of said cam bar relative to said chuck and spring means engaging said cam bar and said yoke to hold said cam bar in engagement with the bottom of said second groove and recesses whereby upon operation of said adjusting mechanism to move said bar longitudinally said cam bar will remain stationary and said base block will move with said bar, the resulting relative movement between said base block and said cam bar serving to move said stone radially of said bar to adjust the honing diameter of said mandrel.

24. A honing mandrel for blind holes comprising an elongated bar with the rear end adapted to be received in the chuck of a honing machine for rotation therewith, means on the rear end of said bar for releasably securing the same to the adjusting mechanism of said honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a groove connecting said recesses with one wall of said groove forming a continuation of one side wall of both recesses, a second groove connecting said recesses with one wall of said second groove forming a continuation of the opposite side wall of both recesses, a flat elongated cam bar slidably disposed in said second groove with a forward portion extending into said first recess in engagement with said opposite side wall and with a rear portion extending into said second recess, spaced inclined cam surfaces on the forward portion of said cam bar, a base block received in said first recess and having spaced inclined surfaces engaging said cam surfaces, a stone mounted on said base block and projecting from said first recess radially of said bar, the forward end of said stone and said base block terminating in alignment with the forward end of said bar, a socket in the side of said base block facing said one side wall, a flat elongated holding member disposed in said first recess between said base block and said one side wall, a pin on said member received in said socket, said member extending through said first groove and terminating in said second recess, means pivotally mounting the end of said member in said second recess on said bar, spring means removably mounted in said first groove and engaging said member to hold said inclined surfaces on said base block in engagement with said cam surfaces, said holding member serving to prevent relative longitudinal movement between said base block and said bar, a yoke pivotally mounted on the rear end of said cam bar, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke substantially perpendicular to the longitudinal axis of said bar and prevent longitudinal movement of said cam bar relative to said chuck and spring means engaging said cam bar and said yoke to hold said cam bar in engagement with the bottom of said second groove and recesses whereby upon operation of said adjusting mechanism to move said bar longitudinally said cam bar will remain stationary and said base block will move with said bar, the resulting relative movement between said base block and said cam bar serving to move said stone radially of said bar to adjust the honing diameter of said mandrel.

25. A honing mandrel for blind holes comprising an elongated bar with the rear end adapted to be received in the chuck of a honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a groove connecting said recess with one wall of said groove forming a continuation of one side wall of both recesses, a second groove connecting said recesses with one wall of said second groove forming a continuation of the opposite side wall of both recesses, an elongated cam bar slidably disposed in said second groove with a forward portion extending into said first recess in engagement with said opposite side wall and with a rear portion extending into said second recess, spaced inclined cam surfaces on the forward portion of said cam bar, a base block received in said first recess and having spaced inclined surfaces engaging said cam surfaces, a stone mounted on said base block and projecting from said first recess radially of said bar, the forward end of said stone and said base block terminating in alignment with the forward end of said bar, a socket in the side of said base block facing said one side wall, an elongated holding member disposed in said first recess between said base block and said one side wall, a pin on said member received in said socket, said member extending through said first groove and terminating in said second recess, means pivotally mounting the end of said member in said second recess on said bar, spring means removably mounted in said first groove and engaging said member to hold said inclined surfaces on said base block in engagement with said cam surfaces, said holding member serving to prevent relative longitudinal movement between said base block and said bar, a yoke pivotally mounted on the rear end of said cam bar, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke substantially perpendicular to the longitudinal axis of said bar and prevent longitudinal movement of said cam bar relative to said chuck and spring means engaging said cam bar and said yoke to hold said cam bar in engagement with the bottom of said second groove and recesses whereby upon operation of said adjusting mechanism to move said bar longitudinally said cam bar will remain stationary and said base block will move with said bar, the resulting relative movement between said base block and said cam bar serving to move said stone radially of said bar to adjust the honing diameter of said mandrel.

26. A honing mandrel for blind holes comprising an elongated bar with the rear end adapted to be received in the chuck of a honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a groove connecting said recesses with one wall of said groove forming a continuation of one side wall of both recesses, a second groove connecting said recesses with one wall of said second groove forming a continuation of the opposite side wall of both recesses, an elongated cam bar slidably disposed in said second groove with a forward portion extending into said first recess in engagement with said opposite side wall and with a rear portion extending into said second recess, an inclined cam surface on the forward portion of said cam bar, a base block received in said first recess and having an inclined surface engaging said cam surface, a stone mounted on said base block and projecting from said first recess radially of said bar, the forward end of said stone and said base block terminating in alignment with the forward end of said bar, a socket in the side of said base block facing said one side wall, an elongated holding member disposed in said first recess between said base block and said one side wall, a pin on said member received in said socket, said member extending through said first groove and terminating in said second recess, means pivotally mounting the end of said member in said second recess on said bar, spring means removably mounted in said first groove and engaging said member to hold said inclined surface on said base block in engagement with said cam surface, said holding member serving to prevent relative longitudinal movement between said base block and said bar, a yoke pivotally mounted on the rear end of said cam bar, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke substantially perpendicular to the longitudinal axis of said bar and prevent longitudinal movement of said cam bar relative to said chuck and spring means engaging said cam bar and said yoke to hold said cam bar in engagement with the bottom of said second groove and recesses whereby upon operation of said adjusting mechanism to move said bar longitudinally, said cam bar will remain stationary and said base block will move with said bar, the resulting relative movement between said base block and said cam bar serving to move said stone radially of said bar to adjust the honing diameter of said mandrel.

27. A honing mandrel for blind holes comprising an elongated bar with the rear end adapted to be received in the chuck of a honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a groove connecting said recesses with one wall of said groove forming a continuation of one side wall of both recesses, a second groove connecting said recesses with one wall of said second groove forming a continuation of the opposite side wall of both recesses, an elongated cam bar slidably disposed in said second groove with a forward portion extending into said first recess in engagement with said opposite side wall and with a rear portion extending into said second recess, an inclined cam surface on the forward portion of said cam bar, a base block received in said first recess and having an inclined surface engaging said cam surface, a stone mounted on said base block and projecting from said first recess radially of said bar, the forward end of said stone and said base block terminating in alignment with the forward end of said bar, an elongated holding member disposed in said first recess between said base block and said one side wall, means on said member connecting the same to said base block, said member extending through said first groove and terminating in said second recess, means pivotally mounting the end of said member in said second recess on said bar, spring means engaging said member to hold said inclined surface on said base block in engagement with said cam surface, said holding member serving to prevent relative longitudinal movement between said base block and said bar, a yoke pivotally mounted on the rear end of said cam bar, a stud on said yoke projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and yoke substantially perpendicular to the longitudinal axis of said bar and prevent longitudinal movement of said cam bar relative to said chuck and spring means engaging said cam bar and said yoke to hold said cam bar in engagement with the bottom of said second groove and recesses whereby upon operation of said adjusting mechanism to move said bar longitudinally said cam bar will remain stationary and said base block will move with said bar, the resulting relative movement between said base block and said cam bar serving to move said stone radially of said bar to adjust the honing diameter of said mandrel.

28. A honing mandrel for blind holes comprising an elongated bar with the rear end adapted to be received in the chuck of a honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a groove connecting said recesses with one wall of said groove forming a continuation of one side wall of both recesses, a second groove connecting said recesses with one wall of said second groove forming a continuation of the opposite side wall of both recesses, an elongated cam bar slidably disposed in said second groove with a forward portion extending into said first recess in engagement with said opposite side wall and with a rear portion extending into said second recess, an inclined cam surface on the forward portion of said cam bar, a base block received in said first recess and having an inclined surface engaging said cam surface, a stone mounted on said base block and projecting from said first recess radially of said bar, the forward end of said stone and said base block terminating in alignment with the forward end of said bar, an elongated holding member disposed in said first recess between said base block and said one side wall, means on said member connecting the same to said base block, said member extending through said first groove and terminating in said second recess, means pivotally mounting the end of said member in said second recess on said bar, spring means engaging said member to hold said inclined surface on said base block in engagement with said cam surface, said holding member serving to prevent relative longitudinal movement between said base block and said bar, a stud pivotally mounted on the rear end of said cam bar and projecting outwardly from said second recess radially of said bar, angularly spaced elongated shoes secured to the forward portion of said bar and cooperating with said stone to provide a three point engagement with the surface of a hole to be honed, said stud providing means engageable with said chuck to hold said stud and prevent longitudinal movement of said cam bar relative to said chuck and spring means engaging said cam bar and said stud to hold said cam bar in engagement with the bottom of said second groove and recesses whereby upon operation of said adjusting mechanism to move said bar longitudinally said cam bar will remain stationary and said base block will move with said bar, the resulting relative movement between said base block and said cam bar serving to move said stone radially of said bar to adjust the honing diameter of said mandrel.

29. A honing mandrel for blind holes comprising an elongated bar with the rear end adapted to be received in the chuck of a honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a groove connecting said recesses with one wall of said groove forming a continuation of one side wall of both recesses, a second groove connecting said recesses with one wall of said second groove forming a continuation of the opposite side wall of both recesses, an elongated cam bar slidably disposed in said second groove with a forward portion extending into said first recess in engagement with said opposite side wall and with a rear portion extending into said second recess, an inclined cam surface on the forward portion of said cam bar, a base block received in said first recess and having an inclined surface engaging said cam surface, a stone mounted on said base block and projecting from said first recess radially of said bar, the forward end of said stone and said base block terminating in alignment with the forward end of said bar, an elongated holding member disposed in said first recess between said base block and said one side wall, means on said member connecting the same to said base block, said member extending through said first groove and terminating in said second recess, means pivotally mounting the end of said member in said second recess on said bar, spring means engaging said member to hold said inclined surface on said base block in engagement with said cam surface, said holding member serving to prevent relative longitudinal movement between said base block and said bar, a stud pivotally mounted on the rear end of said cam bar and projecting outwardly from said second recess radially of said bar, said stud providing means engageable with said chuck to hold said stud and prevent longitudinal movement of said cam bar relative to said chuck and spring means engaging said cam bar and said stud to hold said cam bar in engagement with the bottom of said second groove and recesses whereby upon operation of said adjusting mechanism to move said bar longitudinally said cam bar will remain stationary and said base block will move with said bar, the resulting relative movement between said base block and said cam bar serving to move said stone radially of said bar to adjust the honing diameter of said mandrel.

30. A honing mandrel for blind holes comprising an elongated bar with the rear end adapted to be received in the chuck of a honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a groove connecting said recesses, a second groove connecting said recesses, an elongated cam bar slidably disposed in said second groove with a forward portion extending into said first recess in engagement with one side wall and with a rear portion extending into said second recess, an inclined cam surface on the forward portion of said cam bar, a base block received in said first recess and having an inclined surface engaging said cam surface, a stone mounted on said base block and projecting from said first recess radially of said bar, the forward end of said stone and said base block terminating in alignment with the forward end of said bar, an elongated holding member disposed in said first recess between said base block and the opposite side wall, means on said member connecting the same to said base block, said member extending through said first groove and terminating in said second recess, means pivotally mounting the end of said member in said second recess on said bar, spring means engaging said member to hold said inclined surface on said base block in engagement with said cam surface, said holding member serving to prevent relative longitudinal movement between said base block and said bar, a stud pivotally mounted on the rear end of said cam bar and projecting outwardly from said second recess radially of said bar, said stud providing means engageable with said chuck to hold said stud and prevent longitudinal movement of said cam bar relative to said chuck and spring means engaging said cam bar and said stud to hold said cam bar in engagement with the bottom of said second groove and recesses whereby upon operation of said adjusting mechanism to move said bar longitudinally said cam bar will remain stationary and said base block will move with said bar, the resulting relative movement between said base block and said cam bar serving to move said stone radially of said bar to adjust the honing diameter of said mandrel.

31. A honing mandrel for blind holes comprising an elongated bar with the rear end adapted to be received in the chuck of a honing machine for rotation therewith, means on the rear end of said bar for releasably securing the same to the adjusting mechanism of said honing machine, an elongated recess in said bar opening at the side and forward end of said bar, a second elongated recess in the rear end of said bar and terminating in spaced relation to the said first recess, a groove connecting said recesses, a second groove connecting said recesses, an elongated cam bar slidably disposed in said second groove with a forward portion extending into said second groove with a forward portion extending into said first recess, and with a rear portion extending into said second recess, an inclined cam surface on the forward portion of said cam bar, a base block received in said first recess and having an inclined surface engaging said cam surface, a stone mounted on said base block and projecting from said first recess radially of said bar, the forward end of said stone and said base block terminating in alignment with the forward end of said bar, an elongated holding member disposed in said first recess on the opposite side of said base block from said cam bar, means on said member connecting the same to said base block, said member extending through said first groove and terminating in said second recess, means pivotally mounting the end of said member in said second recess on said bar, spring means engaging said member to hold said inclined member in said second recess on said bar, spring means engaging said member to hold said inclined surface on said base block in engagement with said cam surface, said holding member serving to prevent relative longitudinal movement between said base block and said bar, a stud pivotally mounted on the rear end of said cam bar and projecting outwardly from said second recess radially of said bar, said stud providing means engageable with said chuck to hold said stud and prevent longitudinal movement of said cam bar relative to said chuck and spring means engaging said cam bar and said stud to hold said cam bar in engagement with the bottom of said second groove and recesses whereby upon operation of said adjusting mechanism to move said bar longitudinally said cam bar will remain stationary and said base block will move with said bar, the resulting relative movement between said base block and said cam bar serving to move said stone radially of said bar to adjust the honing diameter of said mandrel.

References Cited in the file of this patent
UNITED STATES PATENTS

| Number | Name | Date |
| --- | --- | --- |
| 1,989,831 | Sunnen | Feb. 5, 1935 |
| 2,350,969 | Sunnen | June 6, 1944 |
| 2,376,850 | Sunnen | May 22, 1945 |
| 2,543,515 | Wagstaff | Feb. 27, 1951 |